United States Patent
Hara et al.

[11] Patent Number: 5,339,110
[45] Date of Patent: Aug. 16, 1994

[54] SOUND MULTIPLEX BROADCAST RECEIVER AND METHOD OF CONTROLLING DISPLAY THEREOF

[75] Inventors: Youji Hara, Yokosuka; Yasuhiro Kasahara, Yokohama, both of Japan

[73] Assignee: Hitachi, Ltd., Tokyo, Japan

[21] Appl. No.: 4,519

[22] Filed: Jan. 14, 1993

[30] Foreign Application Priority Data

Jan. 24, 1992 [JP] Japan ................... 4-011107

[51] Int. Cl.$^5$ .................................. H04N 5/60
[52] U.S. Cl. ..................... 348/485; 348/738; 348/569
[58] Field of Search ............... 358/198, 188, 194.1, 358/192.1, 143, 197; 381/3, 4; 348/462, 483, 485, 738; H04N 5/60

[56] References Cited

U.S. PATENT DOCUMENTS

| 4,646,150 | 2/1987 | Robbins et al. | 358/197 |
| 4,907,082 | 3/1990 | Richards | 358/143 |

FOREIGN PATENT DOCUMENTS

| 0010975 | 1/1987 | Japan | H04N 5/60 |
| 0166887 | 6/1990 | Japan | H04N 5/60 |

OTHER PUBLICATIONS

"Television Technology," Nov. 1978, p. 34. (provided in Japanese).

*Primary Examiner*—Mark R. Powell
*Assistant Examiner*—Jeffrey S. Murrell
*Attorney, Agent, or Firm*—Fay, Sharp, Beall, Fagan, Minnich & McKee

[57] ABSTRACT

In a sound multiplex broadcast system employing sound multiple signals having a plurality of sound multiplex modes and a display control method therefor, there are detected kinds of sound multiplex mode of sound multiple signals received by the receiver, a sound multiplex mode is set, a demodulated sound output signal of a mode determined according to the mode detection signals and the mode setting signal is selected from demodulated sound output signals attained by demodulating the received sound multiple signals so as to be supplied to a sound output unit, and a kind of sound multiplex mode of the demodulated sound output signal thus selected is displayed on a display unit.

20 Claims, 3 Drawing Sheets

| A \ B | MONAURAL | STEREO | SAP |
|---|---|---|---|
| MON-AURAL | (a) 12 ... 10:15 | (e) 12 ... 10:15 | (i) 12 ... 10:15 |
| STEREO (ALONE) | (b) 12 ... 10:15 | (f) STEREO 12 ST ... 10:15 | (j) STEREO 12 ST ... 10:15 |
| SAP (ALONE) | (c) 12 ... 10:15 | (g) 12 SA ... 10:15 | (k) SAP 12 SA ... 10:15 |
| STEREO + SAP | (d) [12] G  H [10:15] | (h) [STEREO] 12 D  [ST/SA] C  10:15 | (l) SAP 12 ST/SA ... 10:15 |

FIG. 5

SOUND MULTIPLEX BROADCAST RECEIVER AND METHOD OF CONTROLLING DISPLAY THEREOF

BACKGROUND OF THE INVENTION

The present invention relates to a multiplex broadcast receiver having a sound multiplex demodulator circuit, and in particular, to a sound multiplex broadcast receiver and a method of controlling display thereof in which modes of sound output signals from the receiver can be displayed.

In a sound multiplex broadcast receiver (for example, a television receiver) for use in a sound multiplex broadcast system of the United States of America (U.S.) and-/or Japan, display of a sound multiplex receiving mode according to detection of presence or absence of a broadcast sound multiple signal and display of a sound multiplex setting mode established by the user are controlled in general by a light-emitting diode or a switching device as described, for example, in page 34 of the "Television Technology", Nov. 1978. However, recently, thanks to adoption of a cathode-ray tube (CRT) screen for the display operations, the receiving and setting modes above are displayed on the CRT display for the control operations thereof.

Moreover, in the receiver of this kind, the state of mode is not displayed for the sound output signal from the receiver. Consequently, to discriminate the mode of the output signal, the user has been required to check presence or absence of the display of the sound multiplex reception mode and the display of the mode established by the user.

SUMMARY OF THE INVENTION

In this connection, in the sound multiplex broadcast receiver, when the sound multiplex mode set by the user is not being transmitted, since the sound demodulation output signal is missing, a mode change-over or switch operation is automatically executed to another sound output mode under transmission. In consequence, when the sound multiplex mode set by the user is not being transmitted, the state of mode set by the user does not match that of the sound output signal from the receiver. This leads to a disadvantage that the state of mode cannot be discriminated for the sound output signal from the receiver.

The discrimination of the sound output signal from the receiver is easily accomplished if only two kinds of sound channels are employed like in the case of the sound multiplex broadcast system of Japan. However, this may not be possible when there are adopted a plurality of sound channels, for example, in the sound multiplex broadcast system of the United States.

It is therefore an object of the present invention is to provide a sound multiplex broadcast receiver and a method of controlling display thereof in which the drawbacks of the conventional sound multiplex broadcast receiver are removed.

Another object of the present invention is to provide a sound multiplex broadcast receiver and a method of controlling display thereof in which the kinds of mode of sound output signals from the receiver, which have been conventionally discriminated by the user, can be automatically detected to be accordingly displayed.

According to an aspect of the present invention, a sound multiplex broadcast receiver for use in a sound multiplex broadcast system employing sound multiple signals having a plurality of sound multiplex modes includes a mode detecting unit for detecting kinds of sound multiplex mode of sound multiple signals received by the receiver and outputting mode detection signals, a mode setting unit for setting a sound multiplex mode and outputting a mode setting signal, a selecting unit for selecting, from demodulated sound output signals attained by demodulating the received sound multiple signals, a demodulated sound output signal of a mode determined according to the mode detection signals and the mode setting signal and supplying the selected signal to a sound output unit, and a display unit capable of displaying thereon a kind of sound multiplex mode of the demodulated sound output signal thus selected.

That is, in the configuration according to the present invention, in order to achieve the object above, the kinds of mode of sound output signals from the receiver are automatically decided depending on a signal obtained by sensing sound reception modes and a mode setting signal established by the user, thereby presenting the kind of mode on a display unit.

Namely, the change-over operation of the sound output signals from the receiver is supervised by the detection signal indicating the sound reception modes and the mode setting signal specified by the user. Consequently, the types of mode of sound output signals from the receiver can be decided depending on the control signal for the change-over operation so as to be displayed on the display unit, which enables the user to automatically determine the kinds of mode of the sound output signals.

As above, according to the present invention, the decision of the sound modes of sound output signals from the sound multiplex broadcast receiver, which have been heretofore accomplished by the user, can be automatically displayed by the receiver. This reduces the load imposed on the user and makes it possible to correctly display the sound output modes, thereby highly improving the usability of the receiver for the user.

As an example, the display unit displays, in response to a channel change-over operation of the sound multiplex broadcast, a kind of sound multiplex mode of the demodulated sound output signal thus selected.

In another example, the display unit displays, in response to a change in the sound multiplex mode of the demodulated sound output signal thus selected, a changed kind of sound multiplex mode of the demodulated sound output signal thus selected.

As still another example, there is further disposed a unit for indicating a mode display such that the display unit displays, in response to the indication of the mode display, a kind of sound multiplex mode of the demodulated sound output signal thus selected.

As further another example, the display unit is capable of further displaying a kind of the sound multiplex mode thus set by the user.

As another example, the display unit is capable of further displaying kinds of sound multiplex mode of the received sound multiple signals.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, description will be given of embodiments of the sound multiplex broadcast receiver according to the present invention. In these embodiments, the present invention is applied to a television receiver of the sound multiplex broadcast system.

Figure 1:
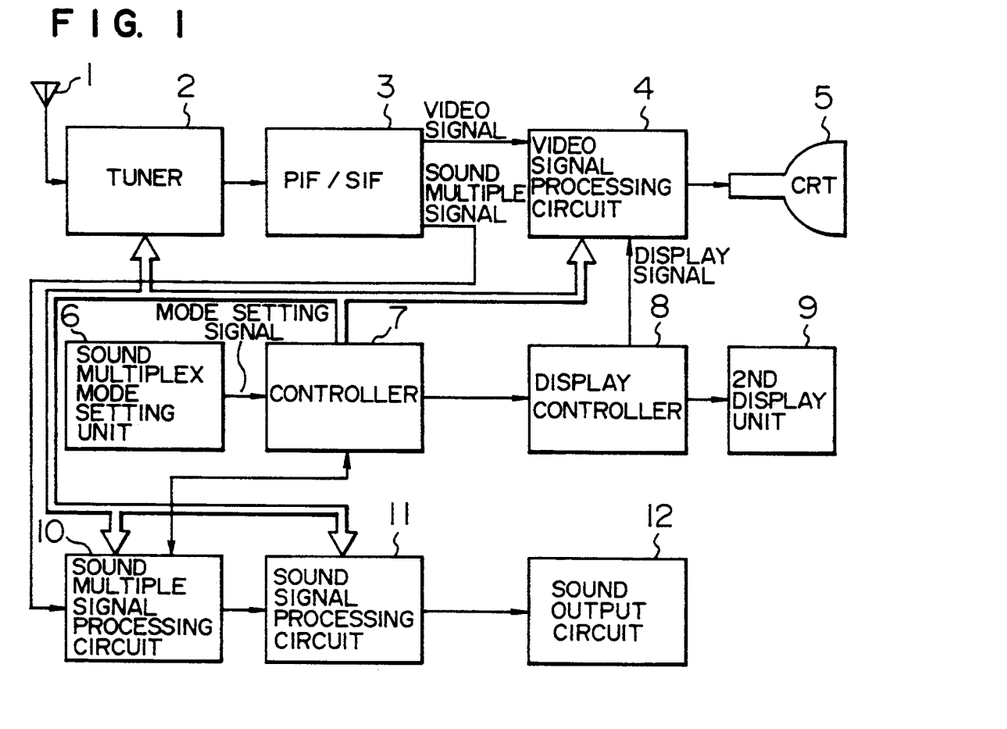
FIG. 1 is a block diagram schematically showing the overall configuration of a sound multiplex broadcast television receiver in a typical embodiment according to the present invention.
Figure 2:
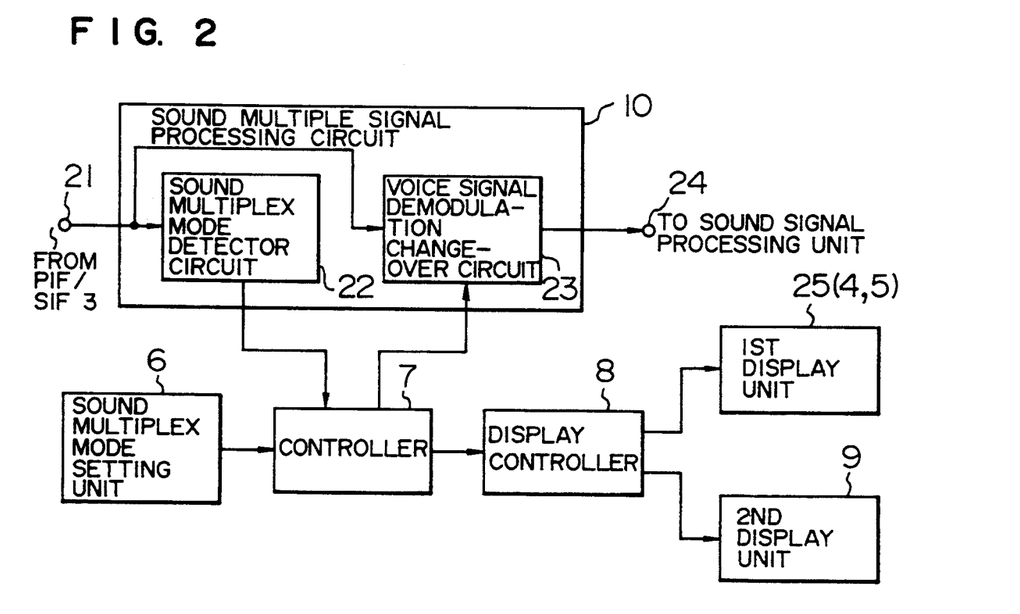
FIG. 2 is a block diagram showing the constitution of primary portions of the television receiver of FIG. 1.

FIG. 1 shows in a block diagram the overall structure of a television receiver of the sound multiplex broadcast system according to the present invention. FIG. 2 is a block diagram showing the constitution of the main sections of the television receiver. In the construction of FIG. 1, an antenna 1 receives a radio wave of the television broadcast system and then resultantly supplies a radio frequency (RF) signal to a tuner 2. The tuner 2 is supervised by a control circuit 7 to transform an RF signal of an arbitrary channel selected by the user into an inter-frequency.

A picture inter-frequency/sound inter-frequency (PIF/SIF) circuit 3 amplifies and detects PIF and SIF signals delivered from the tuner 2 to obtain a video signal and a sound multiple signal. A video signal processing circuit 4 processes under control of the controller 7 the video signal fed from the PIF/SIF circuit and a display signal supplied from a display control circuit 8 to send the video signal to a cathoderay tube (CRT) 5 as a display unit, thereby presenting an image on the display unit 5.

A sound multiplex mode setting unit 6 sets a sound multiplex mode selected by the user and generally includes a light receiving section for receiving an infrared light denoting a sound multiplex mode sent from a key switch unit or a remote controller to set a sound multiplex mode.

The unit 6 supplies the control circuit 7 with a mode setting signal designating a sound multiplex mode established by the keyboard or the remote controller and a (channel selection) signal denoting a channel selected thereby.

The controller 7 controls the receiving channel of the tuner 2 in response to the channel selection signal from the mode setting unit 6 and supervises the signal processing in the video signal processing circuit 4, a sound multiplex processing circuit 10, and a sound signal processing circuit 11. Moreover, the controller 7 operates in response to the mode setting signal and the receiving mode detection signal which is produced from the circuit 10 to supply display signals via the display controller 8 to the circuit 4 and a second display unit 9, for example, display elements including light-emitting diodes. As shown in FIG. 2, the circuit 4 and the CRT 5 constitute a first display unit 25. The display controller 8 displays on the CRT 5, in response to a display signal from the controller 7, such items as the kind of the sound multiplex mode (setting mode) instructed by the user.

In addition, the video signal processing circuit supplies the CRT 5 with a display signal according to a reception mode detection signal transmitted via the display controller 8 from the controller 7 and a display signal indicating a mode of sound output signals created from a speaker. As a result, the kind of the sound multiplex mode (reception mode) received from the tuner 2 and the type of mode of sound output signals from the speaker can be displayed.

As shown in FIG. 2, the sound multiple signal processing circuit 10 includes a sound multiplex mode detector circuit 22, receiving sound multiple signals from the PIF/SIF circuit 3 via an input terminal 21 and detecting the reception sound multiplex mode (reception mode) of the received signals, and transmitting a reception mode detection signal to the controller 7 and a sound signal demodulation switching circuit 23 for demodulating the received signals, selecting in response to a control signal from the controller 7 a particular sound channel signal from the demodulated sound channel signals, and outputting the selected signal via an output terminal 24 to the sound signal processing circuit 11.

The circuit 11 processes the sound channel signal delivered from the circuit 10 and then sends the resultant signals as a sound output signal to a sound output circuit 12. The circuit 12 in turn drives a speaker integrated therein according to the sound output signal.

In this embodiment, the CRT 5 is assumed to be a display screen of a television receiver and the second display unit 9 is considered as, for example, display elements such as a plurality of light-emitting diodes (LEDs). The number of LEDs is assumed to correspond to that of the kinds of mode of the sound multiplex broadcast. Moreover, the second display unit 9 may naturally be included in the display screen (CRT 5) of the television receiver. In such a case, the reception mode is also presented on the CRT 5.

Next, description will be given of the operation when the present invention is applied to a television receiver conforming to the sound multiplex broadcast system of the U.S.

The sound channel signals in this case include three kinds of signals, namely, a first sound channel signal (monaural), a second sound channel signal (stereo), and a third sound channel signal (second audio program). The first, second, and third sound channel signals stand for the demodulation signals of the first, second, and third sound multiplex modes, respectively.

Referring to FIG. 2, first, when the user operates the remote controller of the key switch unit for a sound multiplex setting mode screen, the screen is presented on the CRT 5 of the first display unit 25. In this situation, when a predetermined key is activated in the remote controller or the key switch to conduct a conversational operation with the display screen, a sound multiplex mode desired by the user is set in the sound multiplex mode setting unit 6. Moreover, the kind of the established mode is displayed on the CRT 5. After the mode is thus determined, when the user selects a television broadcast channel (station), there is preferentially outputted the sound signal associated with the selected mode. Furthermore, in a case where the mode thus selected is missing in the television broadcast channel, there is outputted a sound signal in a mode of the subsequent grade determined by the control circuit 7. If the sound broadcast of the subsequent mode is missing, a sound signal of a mode next to the subsequent mode is outputted.

Figure 3:
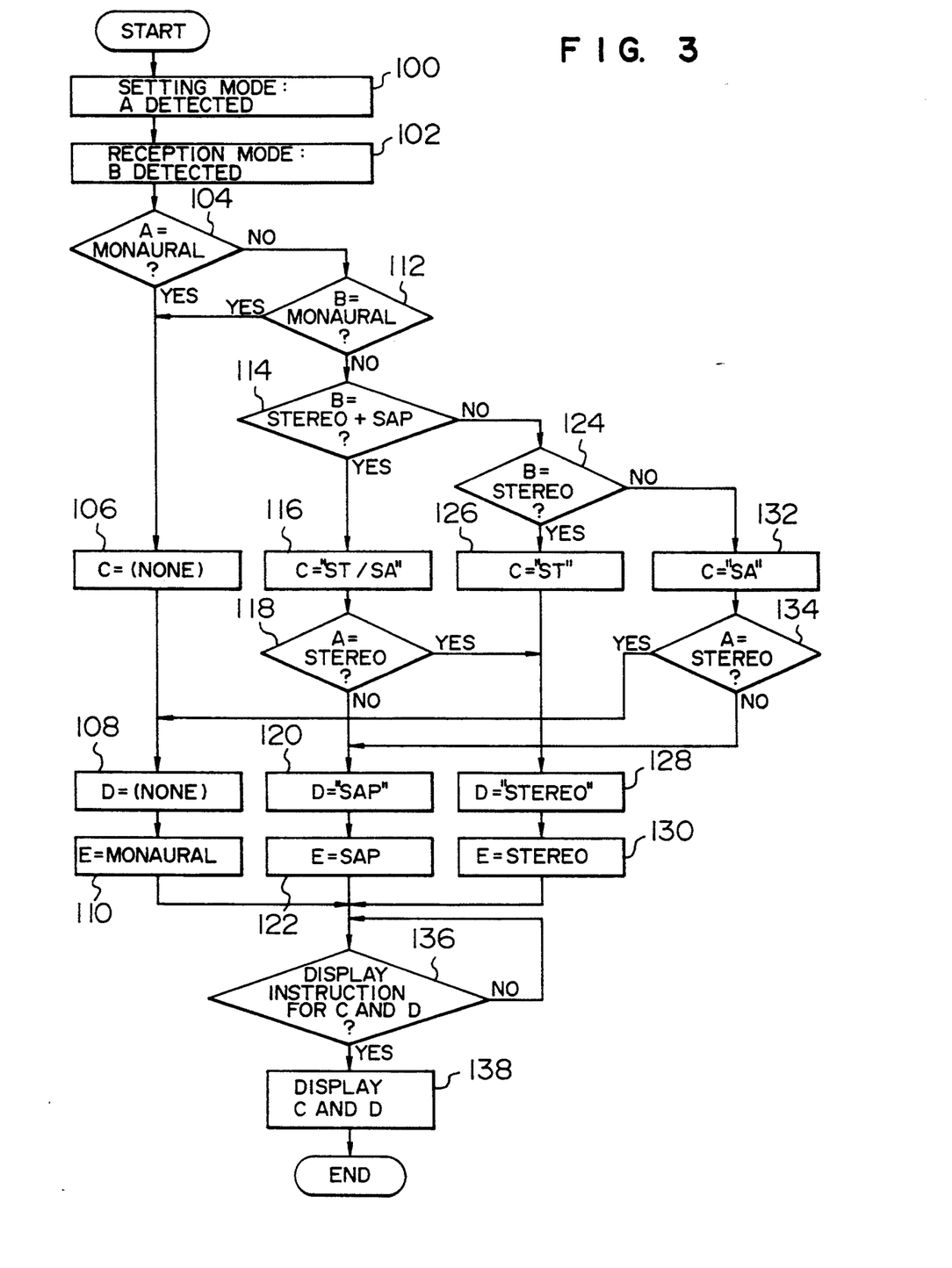
FIG. 3 is a flowchart showing the operation of a control circuit in the embodiment of FIGS. 1 and 2.

Referring now to the flowchart of FIG. 3, description will be given of an example of the operation of the controller 7 achieving the selection of the mode of sound output signals and the control of display of the selected mode. The processing operation of FIG. 3 is achieved in an appropriate manner, for example, at a fixed interval of time. The control circuit 7 may include a micro computer.

In the flowchart, a letter A denotes a setting mode selected by the user, a letter B indicates a mode of the received sound multiplex signal, a letter C stands for display data for presenting a reception mode, a letter D designates display data for displaying a mode (sound output mode or operation state) of sound output signals from the receiver, and a letter E indicates a kind of sound output mode of the receiver.

First, according to the mode setting signal, the setting mode selected by the user is detected (step 100) and then the mode of the received signal is recognized according to the reception mode detection signal (step 102). Next, a check is made to decide whether or not the setting mode A is related to "monaural" (step 104). If this is the case, the system does not set the display data C for the reception mode. Namely, any indication is not made on the second display unit 9 for the setting mode.

In this case, consequently, "monaural" is set as the sound output mode E of the receiver and a control signal is fed to the switching circuit 23 to select a signal of the monaural sound channel. Moreover, the system does not set the display data D for the sound output mode (steps 108 and 110).

In the step 104, if it is determined that the setting mode is other than "monaural", a check is made to determine whether or not the mode B of the received signal is "monaural" (step 112). If this is the case, control is passed to a step 106; otherwise, judgement is conducted to decide whether or not the mode is "stereo" and "SAP" (step 114). If this is the case, the system sets, for example, "ST/SA" as the display data C of the reception mode (step 116). Subsequently, whether or not the setting mode A is "stereo" is judged (step 118). If the mode A is not "stereo" SAP is set as the sound output mode E of the receiver in this case such that the switch circuit 23 selects the signal of the SAP sound channel. Moreover, an indication, for example, "SAP" is set as the display data D of the sound output mode (steps 120 and 122).

On the other hand, in the step 118, if the setting mode A is decided as "stereo", "stereo" is set as the sound output mode E of the receiver such that the switch circuit 23 selects the signal of the stereo sound channel. Furthermore, the system sets, for example, "STEREO" as the display data D of the sound output mode (steps 128 and 130).

In the step 114, if it determined that the mode B of the received signal is other than the condition including "stereo" and "SAP", a check is made to decide whether or not the mode B of the received signal is "stereo" (step 124). If this is the case, for example, "ST" is set as the display data C of the reception mode (step 126). Next, control is transferred to the steps 128 and. 130.

In the step 124, if the mode B of the received signal is other than "stereo" the mode of the received signal is assumed to be "SAP" . For example, "SA" is set as the display data C of the received signal (step 132). Next, a check is made to determine whether or not the setting mode A is "stereo" (step 134). If this is the case, control is passed to the steps 108 and 110; otherwise, the processing proceeds to the steps 120 and 122.

As above, based on the setting mode of the user and the mode of the received signal, the display data C of the reception mode and the display data D of the sound output mode are established. Moreover, a control signal is supplied to the switch circuit 23 so as to determine whether or not there exists a display instruction for the display data C and D in a step 136. If this is the case, display signals respectively representing the display data C and D are sent via the display control circuit 8 to the video signal processing circuit 4, thereby displaying the data C and D on the screen of the CRT 5, for example, for a fixed period of time (step 138). Otherwise, the display operation is postponed until a display instruction is received.

Figure 4:
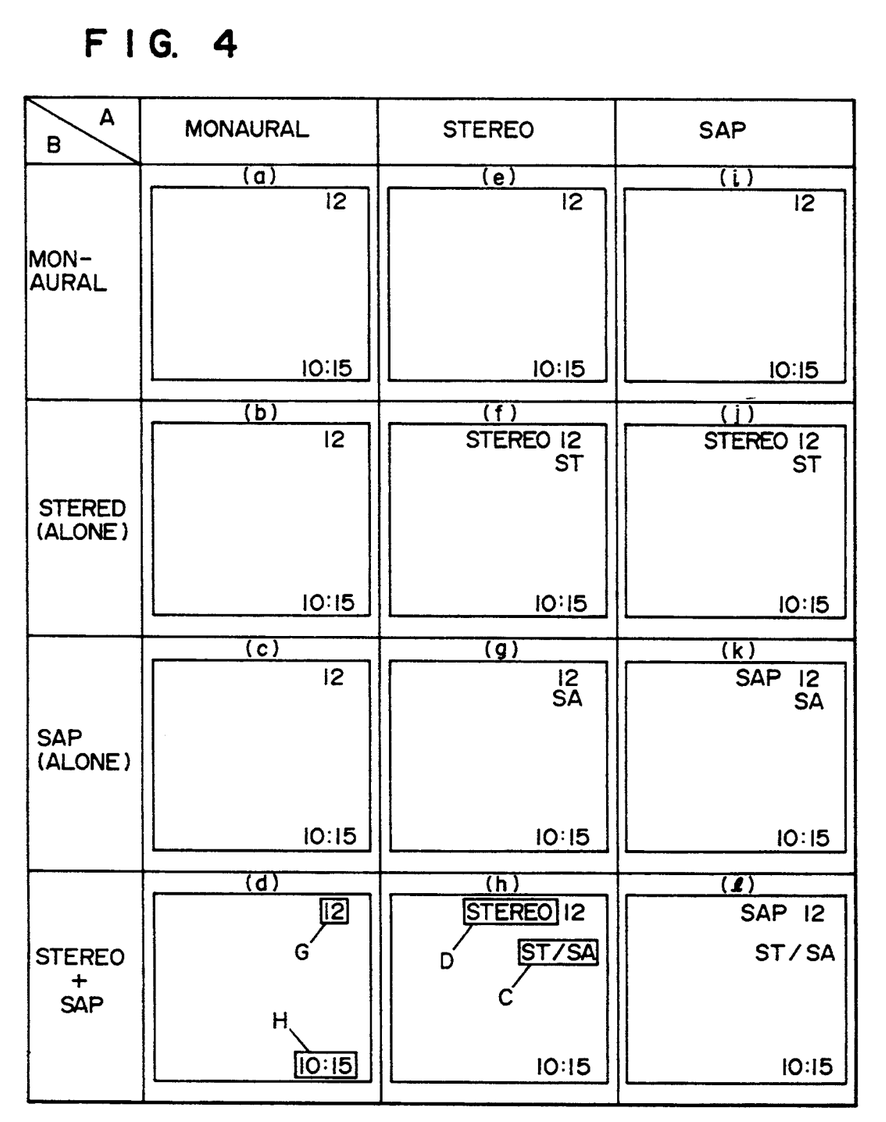
FIG. 4 is a schematic diagram showing display examples presented in a first display unit of the embodiment of FIGS. 1 and 2.

FIG. 4 shows an example of display on the screen of the CRT 5 in which, for example, when the mode B of the received signal is "stereo" and "SAP" and the setting mode A of the use is "stereo" "ST/SA" and "STEREO" are presented respectively as the display data C and D on the screen as shown in (h). In this diagram, letters G and H respectively stand for a channel number and a point of time, which may also be displayed together with the display data C and D. In this example, the setting mode A of the user detected in the step 100 is sent as a display signal designating the display data F from the control circuit 7 via the display controller 8 to the second display unit 9 for the display thereof.

Figure 5:
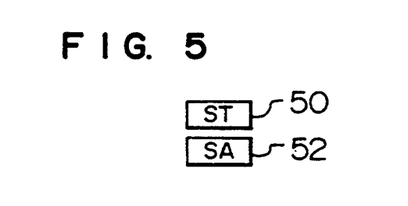
FIG. 5 is a diagram showing an example of the construction of a second display unit of the embodiment of FIGS. 1 and 2.

FIG. 5 shows an example of the second display unit 9 including LEDs 50 and 52 for displaying indications of setting modes. For example, when "stereo" and "SAP" are specified as the setting modes, these items are displayed on the LEDs 50 and 52, respectively. In addition, there may be further disposed an LED for presenting, when the setting mode is "monaural" the indication thereof. These LEDs may be continuously illuminated when the corresponding modes are being set, respectively.

The display instructions include an instruction to be outputted from the controller 7 in response to a channel switch (selection) by the user, an instruction to be issued therefrom in response to detection of a setting mode change-over by the user, and an instruction to be outputted in response to an operation of a recall key or the like of the remote controller or the key switches.

In the example above, the display data C and D and the display data F of the setting mode are presented respectively on the CRT and LEDs. However, all of the data items may be displayed on the CRT or LEDs or it may also be possible to present the display data C of the reception mode and the other data on the LEDs and the CRT, respectively.

Description will next be given of an example of operation of the embodiment thus configured.

Assume that, for example, a stereo broadcast and an SAP broadcast are transmitted in a sound multiplex broadcast as a television channel broadcast for the user and the user sets "SAP" as the sound multiplex mode. When the user selects the station from the remote controller or the like, the kinds of mode of the reception signal are determined by the sound multiplex mode detector 22 to thereby produce an output signal. In response to the signal, the sound reception modes are displayed by the first display unit 25. Namely, since there are two modes "stereo" and "SAP" of the reception signal, in response to a display signal emitted from the controller 7 according to the detection signal of the reception modes from the detector 22, the video signal processing circuit 4 supervises the CRT 5 to present "ST/SA" in the area C ((h) of FIG. 4)) of the screen for a predetermined period of time. With this provision, the stereo and SAP broadcast services are visually notified to the user. In this regard, when the sound multiplex broadcast is missing, the system does not display any image in the area C.

Moreover, the control circuit 7 is being supplied from the sound multiplex mode setting unit 6 with a mode setting signal designating "SAP" selected as the sound multiplex mode by the user. The circuit 7 controls the sound signal demodulation change-over or switch circuit 23 according to the detection signal of reception modes and the mode setting signal. Assuming that sound channel signals "monaural, "stereo" and , "SAP" are being inputted from the input terminal 21 to the circuit 23, the controller 7 supervises the circuit 23 to output a signal of the SAP sound channel. At the same time, the controller 7 sends, in order to visually report the output of SAP sound to the user, a display signal via the display control circuit 8 to the video signal processing circuit 4, thereby presenting "SAP" in the screen area D of the CRT for a preset period of time.

Furthermore, the control circuit 7 supplies, in response to the mode setting signal, a display signal to the circuit 8 to drive the second display unit 9 so as to illuminate the LED 52 for "SAP" which notifies the user that the SAP mode is set by the user. In this situation, the LED 50 for "stereo" is off.

When the SAP broadcast is interrupted in this case (i.e. when "SAP" is set as the mode of sound multiplex broadcast), the controller recognizes the condition according to an output signal from the mode detector 22 and then supervises the circuit 4 to automatically achieve a change-over operation so as to select the stereo sound output. Simultaneously, the controller 7 causes the CRT 5 to display letters "STEREO" in the predetermined area D on the display screen thereof. In this case, the display data C of the reception mode may be simultaneously displayed in the area C.

Thereafter, following the SAP broadcast, when the stereo broadcast is interrupted, the controller 7 similarly conducts the control operation to automatically select the monaural sound output. In this operation, "MONO" may be displayed as the sound output mode of the receiver on the display screen of the CRT 5 for a preset period of time. Alternatively, it may also be possible that the system does not display any indication.

Furthermore, like in the case above, the display data C may be presented at the same time.

As a result of the operations, the state of mode of the sound output signal of the receiver can be automatically detected to be accordingly displayed.

In this connection, it is naturally possible to continuously present the sound output mode. However, in association therewith, visibility of the screen image may be deteriorated in an ordinary operation of the screen. In the embodiment, consequently, the mode display is automatically accomplished only when a station is selected or when the sound output mode is changed.

In addition, in order for the user to confirm at an arbitrary point of time the current state of mode of the sound output signal, the system may be configured such that the selection channel number and the sound output mode can be presented in response to a request from the user, for example, by operating the recall key or the like of the remote controller.

The display letters (symbols) of display data C and D have been shown by way of example in this embodiment, namely, any display characters (symbols) may be utilized.

Moreover, as data to be displayed as above, there may be adopted only the display data D; furthermore, only a combination of display data C and D or a combination of display data C and F may be employed.

According to the present invention, the discrimination of sound modes of the sound output signals from the sound multiplex broadcast receiver, which has been conventionally achieved by the user, can be automatically conducted by the receiver so as to display the sound mode. Consequently, the load imposed on the user is minimized and the sound output mode can be appropriately displayed, which remarkably improves the usability of the receiver for the user.

While particular embodiments of the invention have been shown and described, it will be obvious to those skilled in the art that various changes and modifications may be made without departing from the present invention in its broader aspects.

We claim:

1. A sound multiplex broadcast receiver for use in a sound multiplex broadcast system employing sound multiple signals having a plurality of sound multiplex modes, comprising:
   mode detecting means for detecting at least one sound multiplex mode of the sound multiple signals received by a tuner and outputting a mode detection signal representing the detected mode;
   mode setting means for selectively setting by a user s set sound multiplex mode representing one of said at least one sound multiplex mode detected by said mode detecting means or one of said plurality of sound multiplex modes other than said at least one sound multiplex mode and outputting a mode setting signal representing the set sound multiplex mode;
   selecting means for selecting, from demodulated sound output signals obtained by demodulating the sound multiple signals received by said tuner in a demodulator, one demodulated sound output signal on a basis of a combination of said mode detection signal and said mode setting signal and supplying the selected one demodulated sound output signal to sound output means, the selected one demodulated sound output signal being coincident with the set sound multiplex mode whenever the set sound multiplex mode is inched in the sound multiple signals; and,
   display means connected to said selecting means for simultaneously displaying a mode of said one demodulated sound output signal selected by said selecting means and said detected mode indicated by said mode detection signal.

2. The receiver according to claim 1, wherein the display means displays, in response to a change-over of channel of the sound multiplex broadcast, the sound multiplex mode of the demodulated sound output signal thus selected.

3. The receiver according to claim 1, wherein the display means displays, in response to a change in the sound multiplex mode of the demodulated sound output signal thus selected, a sound multiplex mode of the demodulated sound output signal thus selected.

4. The receiver according to claim 1, further comprising means for indicating a mode display, wherein the display means displays, in response to a request for the indicating of the mode display, the sound multiplex mode of the demodulated sound output signal thus selected.

5. The sound multiplex broadcast receiver according to claim 1, wherein said display means is a display screen of a television receiver for displaying a video signal of the received sound multiple signals used in the sound multiplex broadcast.

6. The receiver according to claim 1, wherein the display means is capable of further displaying the set sound multiplex mode.

7. The receiver according to claim 1, further comprising a display unit capable of displaying the set sound multiplex mode.

8. The sound multiplex broadcast receiver according to claim 1, wherein when the sound multiple signals change from a first condition lacking the set sound multiplex mode to a second condition including the set sound multiplex mode said selecting means selects the one demodulated sound output signal of the mode indicated by said mode detection signal.

9. The sound multiplex broadcast receiver according to claim 1 wherein said selecting means, when the mode indicated by said mode detection signal and the mode indicated by said mode setting signal are not coincident with each other, selects one of the demodulated sound output signal of the mode indicated by said mode detection signal and a demodulated sound output signal of a monaural mode according to predetermined priority.

10. A display control method for a sound multiplex broadcast receiver for use in a sound multiplex broadcast system employing sound multiple signals having a plurality of sound multiplex modes, comprising the steps of:
   detecting at least one sound multiplex mode of the sound multiple signals received by the receiver;
   selectively setting by a user a set sound multiplex mode representing one of said at least one sound multiplex mode detected by said mode detecting means or one of said plurality of sound multiplex modes other than said at least one sound multiplex mode;
   selecting, from demodulated sound output signals obtained by demodulating the sound multiple signals in a demodulator of the receiver, one demodulated sound output signal on a basis of a combination of the detected at least one sound multiplex mode and the set sound multiplex mode and supplying the selected one demodulated sound output signal to sound output means, the selected one demodulated sound output signal being coincident with the set sound multiplex mode whenever the set sound multiplex mode is included in the sound multiple signals; and
   displaying a mode of the one demodulated sound output signal thus selected and said detected at least one sound multiplex mode.

11. The method according to claim 10, further including a changing of a channel and wherein the display step displays, in response to the changing and an associated change of the sound multiplex broadcast, a changed sound multiplex mode of the demodulated sound output signal selected after the associated change.

12. The method according to claim 10, wherein the display step displays, in response to a change in the sound multiplex mode of the one demodulated sound output signal selected, a changed sound multiplex mode of the one demodulated sound output signal selected.

13. The method according to claim 10, further comprising the step of indicating a mode display, wherein the display step displays, in response to the indicating of the mode display, the sound multiplex mode of the demodulated sound output signal thus selected.

14. The method according to claim 10, wherein the display means includes a display screen of a television receiver of the sound multiplex broadcast for displaying thereon video signals of the received sound multiplex broadcast.

15. The method according to claim 10, wherein the display step further displays the set sound multiplex mode.

16. The method according to claim 10, further comprising the step of displaying the set sound multiplex mode.

17. The method according to claim 10, further comprising the step of when the sound multiple signals change from a first condition lacking the set sound multiplex mode to a second condition including the set sound multiplex mode said selecting means selects the one demodulated sound output signal of the mode indicated by said mode detection signal.

18. The method according to claim 10, further comprising the step of when the mode indicated by said mode detection signal and the mode indicated by said mode setting signal are not coincident with each other, selecting one of the demodulated sound output signal of the mode indicated by said mode detection signal and a demodulated sound output signal of a monaural mode according to predetermined priority.

19. A sound multiplex broadcast receiver for use in a sound multiplex broadcast system employing sound multiple signals having a plurality of sound multiplex modes, comprising:
   mode detecting means for detecting a least one sound multiplex mode of sound multiple signals received by a tuner and outputting a mode detection signal representing the detected mode;
   mode setting means for selectively setting by a user a sound multiplex mode representing one of said at least one sound multiplex mode detected by said mode detecting means or one of said plurality of sound multiplex modes other than said at least one sound multiplex mode and outputting a mode setting signal representing the set sound multiplex mode;
   mode selecting means for selecting one mode from said plurality of sound multiplex modes on the basis of a combination of said mode detection signal and said mode setting signal and outputting a mode selection signal;
   sound output selecting means for selecting, from demodulated sound output signals obtained by demodulating by a demodulator the sound multiple signals received by said tuner, one demodulated sound output signal according to said mode selection signal and supplying the selected one demodulated sound output signal to sound output means; and,
   display means connected to said mode selecting means for simultaneously displaying a mode of said one demodulated sound output signal selected by said selecting means and said detected mode indicated by said mode detection signal.

20. The sound multiplex broadcast receiver according to claim 19, wherein said mode selecting means, when the mode indicated by said mode detection signal and the mode indicated by said mode setting signal are not coincident with each other, selects one of the mode indicated by said mode detection signal and a monaural mode according to predetermined priority.

* * * * *

UNITED STATES PATENT AND TRADEMARK OFFICE
CERTIFICATE OF CORRECTION

PATENT NO. : 5,339,110
DATED : August 16, 1994
INVENTOR(S) : Youji Hara, et al.

It is certified that error appears in the above-indentified patent and that said Letters Patent is hereby corrected as shown below:

Claim 1, column 8, line 35, after "user" delete "s" and substitute therefor --a--.

Claim 1, column 8, line 53, delete "inched" and substitute therefor --included--.

Claim 19, column 10, line 45, after the second occurrence of "a" insert --set--.

Signed and Sealed this

Twenty-ninth Day of November, 1994

Attest:

BRUCE LEHMAN

Attesting Officer          Commissioner of Patents and Trademarks